(12) United States Patent
Liu

(10) Patent No.: US 11,505,276 B2
(45) Date of Patent: Nov. 22, 2022

(54) QUICK-RELEASE DEVICE FOR BICYCLE

(71) Applicant: FUL CHEE ENT CO., LTD., Taichung (TW)

(72) Inventor: Yu-Chen Liu, Taichung (TW)

(73) Assignee: FUL CHEE ENT CO., LTD., Taichung (TW)

( * ) Notice: Subject to any disclaimer, the term of this patent is extended or adjusted under 35 U.S.C. 154(b) by 927 days.

(21) Appl. No.: 16/297,696

(22) Filed: Mar. 10, 2019

(65) Prior Publication Data
US 2020/0283089 A1 Sep. 10, 2020

(51) Int. Cl.
B62K 25/02 (2006.01)
B62K 19/30 (2006.01)
B60B 27/02 (2006.01)

(52) U.S. Cl.
CPC .............. B62K 25/02 (2013.01); B62K 19/30 (2013.01); B62K 2206/00 (2013.01)

(58) Field of Classification Search
CPC .. B62K 2206/00; B62K 25/02; B60B 35/109; B60B 35/004; B60B 27/026; B60B 2900/351
USPC ...... 301/124.1, 128; 411/384, 395, 550, 551
See application file for complete search history.

(56) References Cited

U.S. PATENT DOCUMENTS

| 6,089,675 A * | 7/2000 | Schlanger | B60B 27/023 301/124.2 |
| 7,556,321 B2 * | 7/2009 | Hara | B62K 25/02 301/124.2 |
| 9,963,190 B1 * | 5/2018 | Liu | F16B 7/0426 |
| 2002/0070604 A1 * | 6/2002 | Kanehisa | B62K 25/02 192/64 |
| 2012/0049613 A1 * | 3/2012 | Inoue | B62K 23/06 301/124.2 |
| 2017/0349235 A1 * | 12/2017 | Buder | B62K 25/02 |
| 2018/0281892 A1 * | 10/2018 | Chang | B62K 25/02 |
| 2019/0168540 A1 * | 6/2019 | Schlags | B60B 35/025 |
| 2021/0122189 A1 * | 4/2021 | Berrell | B62K 25/02 |

* cited by examiner

Primary Examiner — Anne Marie M Boehler
(74) Attorney, Agent, or Firm — Raymond Chan

(57) ABSTRACT

A quick-release device for a bicycle includes a shaft having a locking assembly at one end and an inner sleeve in another end. The inner sleeve is kept a distance apart from an end edge of a through hole of the shaft to form an inner annular trough portion at an outer end of the through hole. A threaded cylinder is insertedly connected to the inner annular trough portion. A perforation is defined in the threaded cylinder. One axial end of the threaded cylinder has a cylindrical flange. The cylindrical flange is insertedly connected to the inner annular trough portion of the shaft. A bolt is insertedly disposed in the perforation of the threaded cylinder. The bolt passes through the perforation and is inserted into the shaft to be screwed to the inner sleeve, so that the bolt presses and locks the threaded cylinder and the shaft.

3 Claims, 3 Drawing Sheets

QUICK-RELEASE DEVICE FOR BICYCLE

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a quick-release device for a bicycle, and more particularly to a quick-release device having a shaft. The shaft can be replaced with different threads, and the length of the shaft can be changed.

Description of Related Arts

A conventional quick-release structure for a bicycle, as shown in FIG. 1, comprises a shaft 10 having an integrally formed external thread 11 at one end and a locking assembly 12 at another end thereof. The locking assembly 12 has a pressing block 13, a driving axle 14, and a locking handle 15. The external thread 11 is screwed to a screw hole of a bicycle frame. The locking handle 15 is pivoted with the driving axe 14 as an axis. An eccentric portion 151 of the locking handle 15 is pressed against the pressing block 13 to achieve the purpose of tightening the bicycle frame and fixing the wheel set of the bicycle. The above structure has the following disadvantages:

1. In general, the manufacturer will design a variety of bicycles according to different grades and purposes, and bicycle frames have different specifications. In order to match various threads of the bicycle frames, it is necessary to produce various shafts 10 with external threads having different pitches corresponding to the requirements of the threads of the bicycle frames. The cost of the quick-release structure is relatively increased.

2. In order to match the wheelbase of the bicycle frame, it is required to prepare a plurality of shafts 10 of different sizes to meet the demand, which increases the cost greatly and is a major problem in the industry.

Accordingly, the inventor of the present invention has devoted himself based on his many years of practical experiences to solve these problems.

SUMMARY OF THE PRESENT INVENTION

The primary object of the present invention is to solve the above problems and to provide a quick-release device for a bicycle. The quick-release device includes a shaft with a detachable threaded cylinder. One end of the shaft is provided with an inner sleeve having an inner screw hole. A perforation is defined in the threaded cylinder. A bolt is insertedly disposed in the perforation. The bolt is screwedly connected to the inner sleeve, so that the bolt presses and locks the threaded cylinder and the shaft. With the above structure, the shaft can be replaced with different threads, and the length of the shaft can be changed.

In order to achieve the above object, the present invention provides a quick-release device for a bicycle. The quick-release device comprises a shaft in the form of a hollow rod having a through hole therein. One end of the shaft is provided with a locking assembly, and another end of the shaft is provided with an inner sleeve having an inner screw hole secured in the through hole. The inner sleeve is kept a distance apart from an end edge of the through hole to form an inner annular trough portion at an outer end of the through hole. A threaded cylinder is insertedly connected to the inner annular trough portion of the shaft. An outer surface of the threaded cylinder is provided with an external thread. A perforation is defined in the threaded cylinder. One axial end of the threaded cylinder is provided with a cylindrical flange. The cylindrical flange is insertedly connected to the inner annular trough portion of the shaft. A bolt is insertedly disposed in the perforation of the threaded cylinder. The bolt has a driving portion and an outer threaded portion. The outer threaded portion passes through the perforation and is inserted into the through hole to be screwed into the inner screw hole of the inner sleeve, so that the bolt presses and locks the threaded cylinder and the shaft.

In another embodiment of the present invention, a quick-release device for a bicycle is provided. The quick-release device comprises a shaft in the form of a hollow rod having a through hole therein. One end of the shaft is provided with a locking assembly, and another end of the shaft is provided with an inner sleeve having an inner screw hole secured in the through hole. The inner sleeve is kept a distance apart from an end edge of the through hole to form an inner annular trough portion at an outer end of the through hole. A connecting holder is insertedly connected to the inner annular trough portion of the shaft. A central orifice is defined in the connecting holder. One axial end of the connecting holder is provided with an annular flange, and another axial end of the connecting holder is provided with an annular trough communicating with the orifice. The annular flange of the connecting holder is insertedly connected to the inner annular trough portion of the shaft. A threaded cylinder is insertedly connected to the annular trough of the connecting holder. An outer surface of the threaded cylinder is provided with an external thread. A perforation is defined in the threaded cylinder. One axial end of the threaded cylinder is provided with a cylindrical flange. The cylindrical flange is insertedly connected to the annular trough of the connecting holder. A bolt is insertedly disposed in the perforation of the threaded cylinder. The bolt has a driving portion and an outer threaded portion. The outer threaded portion passes through the perforation and the orifice, and is inserted into the through hole to be screwed into the inner screw hole of the inner sleeve so that the bolt presses and locks the threaded cylinder and the shaft.

Preferably, another axial end of the threaded cylinder is provided with a recess communicating with the perforation, and the driving portion of the bolt is received in the recess.

With the above structure, the shaft can be replaced with different threads, and the length of the shaft can be changed.

DETAILED DESCRIPTION OF THE PREFERRED EMBODIMENT

Figure 1:
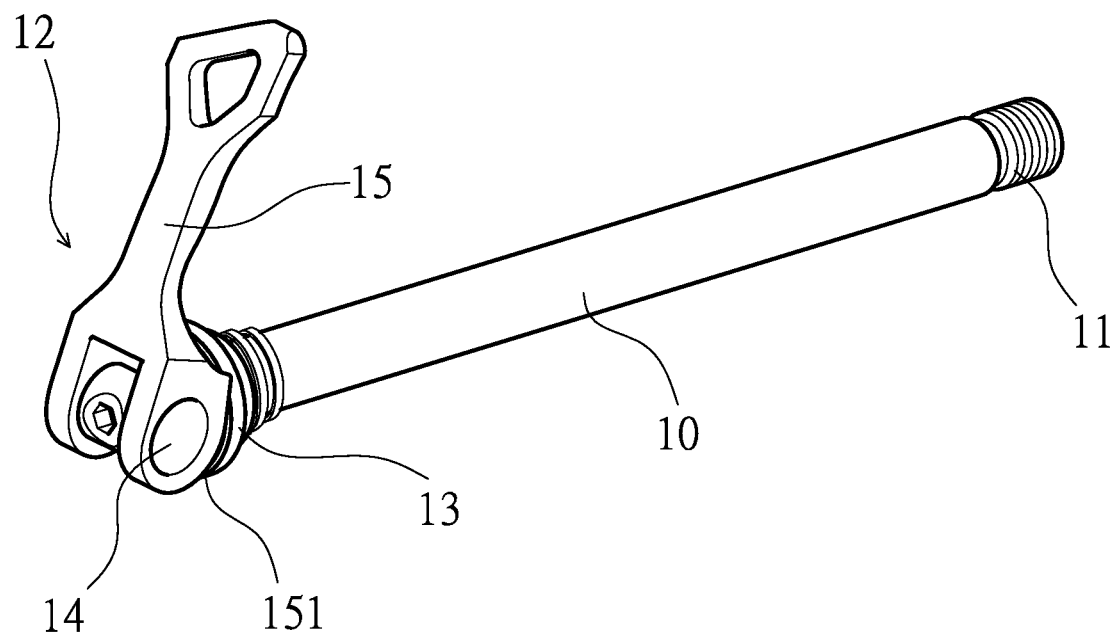
FIG. 1 is a perspective view of a conventional quick-release device for a bicycle.
Figure 2:
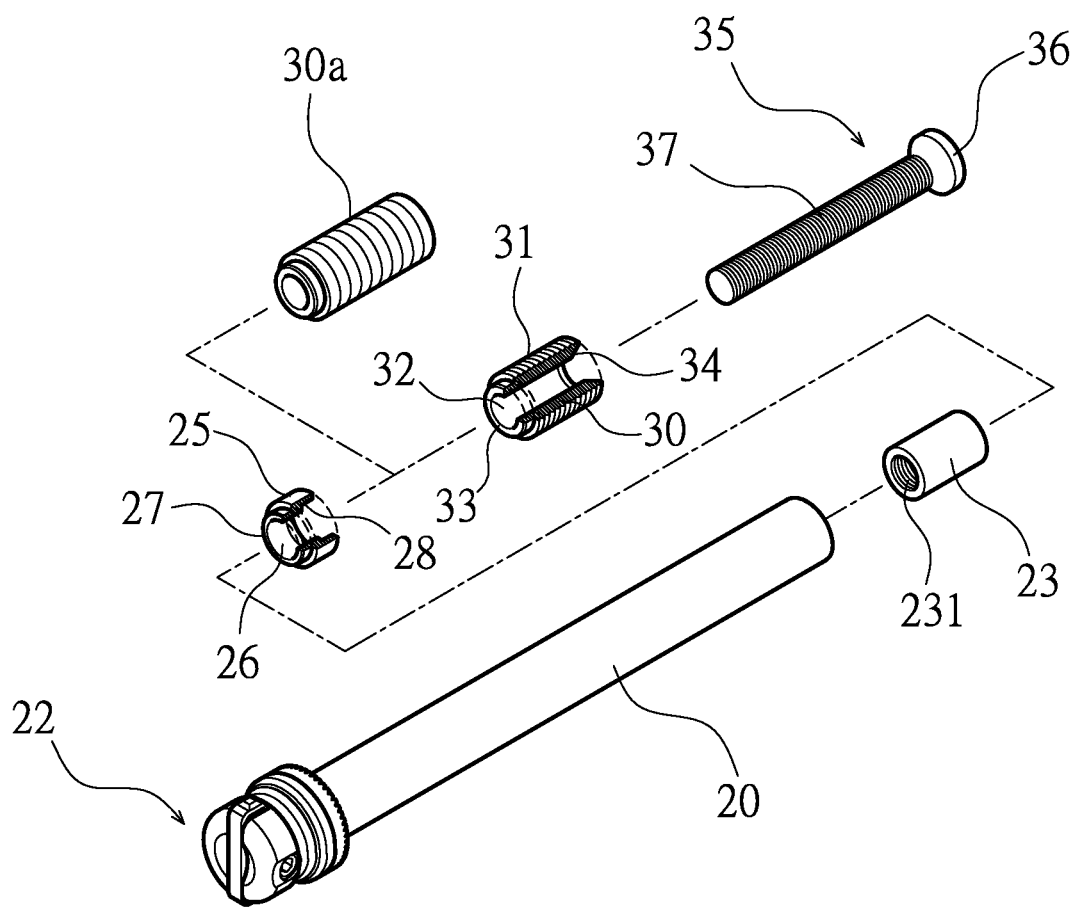
FIG. 2 is an exploded view of the present invention.
Figure 3:
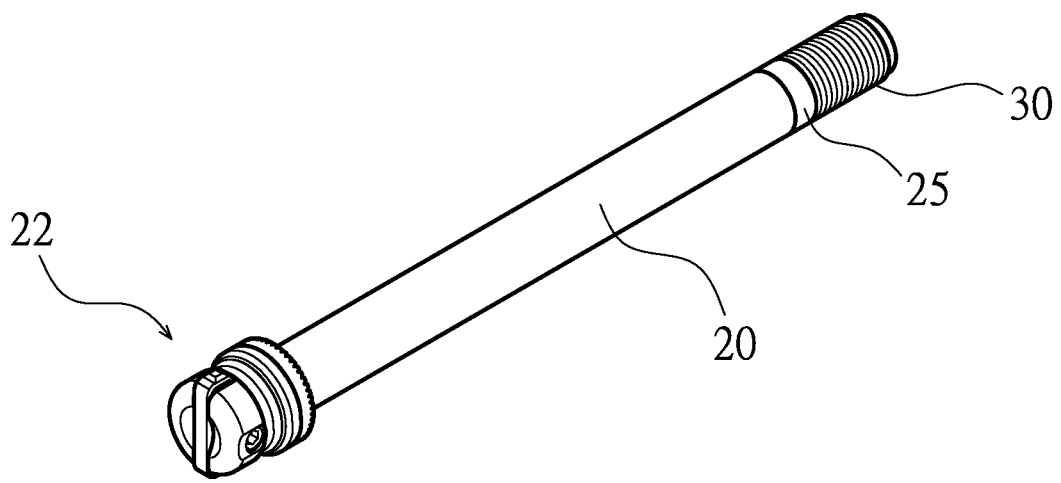
FIG. 3 is a perspective view of the present invention.
Figure 4:
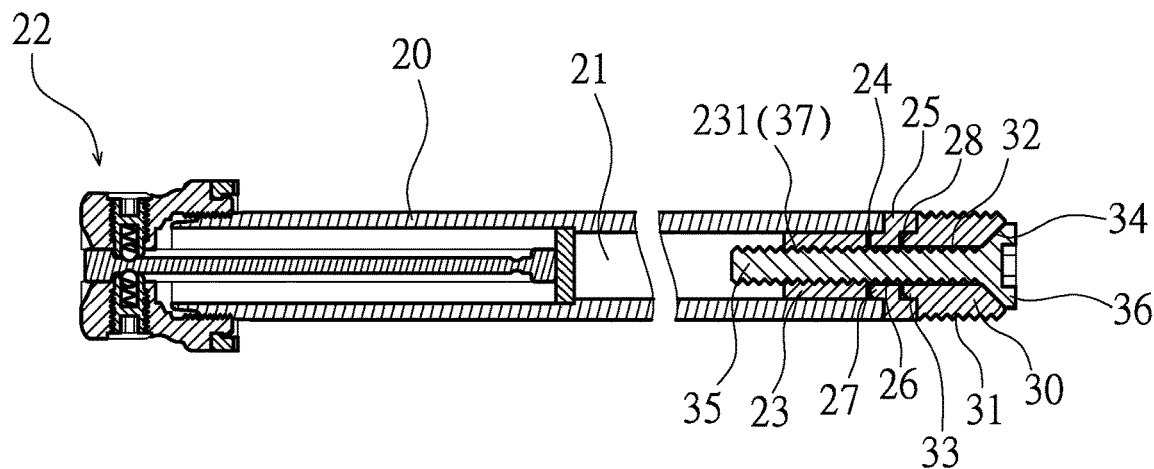
FIG. 4 is a cross-sectional view of the present invention.

Embodiments of the present invention will now be described, by way of example only, with reference to the accompanying drawings.

Referring to FIG. 2 through FIG. 6, a quick-release device for a bicycle of the present invention includes a shaft 20 in the form of a hollow rod having a through hole 21 therein. One end of the shaft 20 is provided with a locking assembly 22, and another end of the shaft 20 is provided with an inner sleeve 23 having an inner screw hole 231 secured in the through hole 21. The inner sleeve 23 is kept a distance apparat from the end edge of the through hole 21 to form an inner annular trough portion 24 at the outer end of the through hole 21. A connecting holder 25 is insertedly connected to the inner annular trough portion 24. A central orifice 26 is defined in the connecting holder 25. One axial end of the connecting holder 25 is provided with an annular flange 27, and another axial end of the connecting holder 25 is provided with an annular trough 28 communicating with the orifice 26. The annular flange 27 of the connecting holder 25 is insertedly connected to the inner annular trough portion 24 of the shaft 20. A threaded cylinder 30 is insertedly connected to the annular trough 28. The outer surface of the threaded cylinder 30 is provided with an external thread 31. A perforation 32 is defined in the threaded cylinder 30. One axial end of the threaded cylinder 30 is provided with a cylindrical flange 33, and another axial end of the threaded cylinder 30 is provided with a recess 28 communicating with the perforation 32. The cylindrical flange 33 may be insertedly connected to the inner annular trough portion 24 of the shaft 20 or the annular trough 28 of the connecting holder 25. A bolt 35 is insertedly disposed in the perforation 32 of the threaded cylinder 30. The bolt 35 has a driving portion 36 and an outer threaded portion 37. The outer threaded portion 37 passes through the perforation 32 and the orifice 26 or is directly inserted into the through hole 21 to be screwed into the inner screw hole 231 of the inner sleeve 23, so that the driving portion 36 of the bolt 35 is received in the recess 34 to press and lock the threaded cylinder 30 and the shaft 20. With the above structure, the shaft 20 can be replaced with different threads, and the length of the shaft 20 can be changed.

Figure 5:
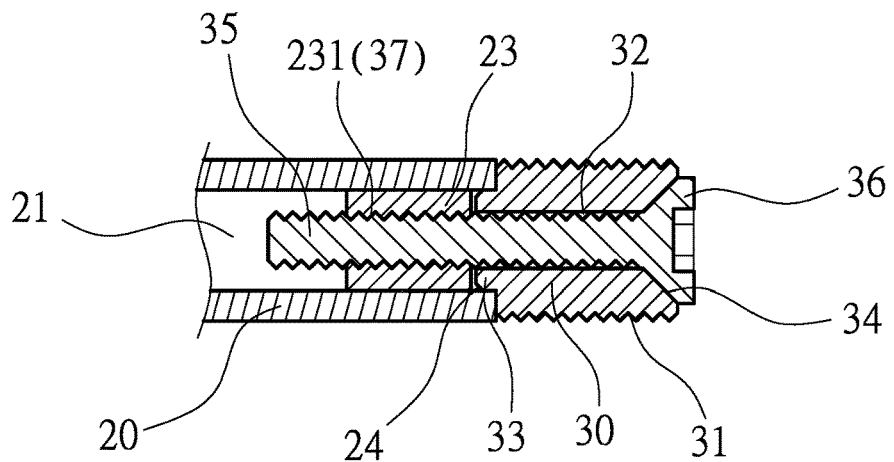
FIG. 5 is a partial cross-sectional view of the present invention, not having a connecting holder.

The assembly and function of the above embodiment are described in detail below. Referring to FIG. 2 through FIG. 6, a suitable threaded cylinder 30 is selected for the shaft 20 of the present invention according to the specification of the screw hole of a bicycle frame. When assembled, the cylindrical flange 33 of the threaded cylinder 30 is engaged in the inner annular trough portion 24 of the shaft 20 (as shown in FIG. 5), and the outer threaded portion 37 of the bolt 35 is inserted from the recess 34 and passes through the perforation 32 and is screwed into the inner screw hole 231 of the inner sleeve 23. The recess 34 is configured to receive the driving portion 36 of the bolt 35, so that the threaded cylinder 30 is screwedly connected to the shaft 20 by the bolt 35. The threaded cylinder 30 after locked is tightly coupled to the shaft 20 to be linked together, that is, after the assembly is completed, it can be directly locked to the screw hole of the bicycle frame. The bicycle frame is tightened and the wheel set is fixed by the locking assembly 22. (The action of the quick-release structure is a conventional technique, and will not be described hereinafter.) When the present invention is applied to another bicycle frame, it is only necessary to choose another suitable threaded cylinder 30a. Of course, the threaded cylinder 30a may have a different length, thread or pitch, and the same shaft 20 can be used. In this way, there is no need for the manufacturer to prepare shafts 20 with different threads, and the consumer end can replace threaded cylinders 30 of different threads to cooperate with a shaft 20. The present invention can be applied to different bicycle frames, thereby achieving cost saving and convenient use.

Figure 6:
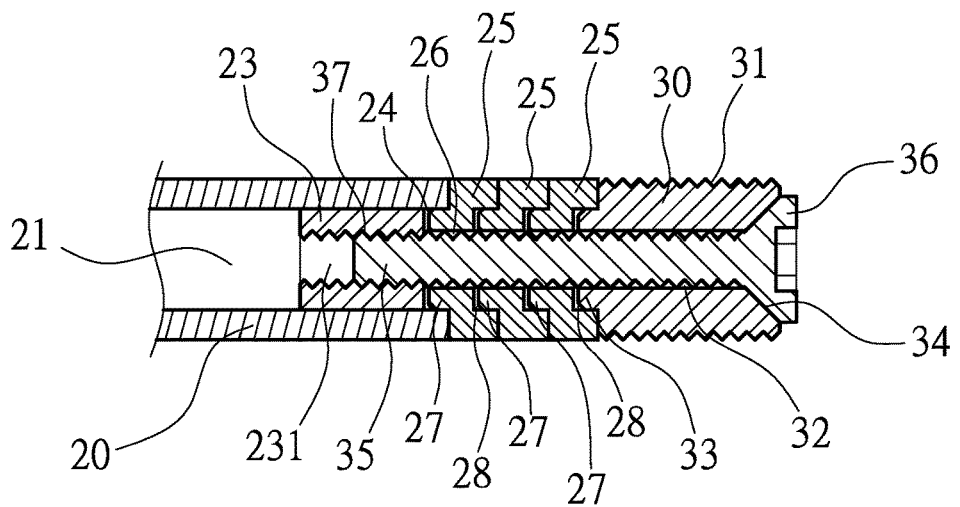
FIG. 6 is a partial cross-sectional view of the present invention, having a plurality of connecting holders.

When the length of the shaft 20 is to be increased to fit different bicycle frames, at least one connecting holder 25 is disposed between the shaft 20 and the threaded cylinder 30 (as shown in FIG. 6). If there are more than two connecting holders 25, the annular flange 27 of the first connecting holder 25 is engaged in the inner annular trough portion 24 of the shaft 20, and the annular flange 27 of the second connecting holder 25 is engaged in the annular trough 28 of the first connecting holder 25, and the rest can be done in the same manner. The cylindrical flange 33 of the threaded cylinder 30 is engaged in the annular trough 28 of the last connecting holder 25. In this way, the length of the shaft 20 can be increased.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A quick-release device for a bicycle, comprising a shaft in the form of a hollow rod having a through hole therein, one end of the shaft being provided with a locking assembly, another end of the shaft being provided with an inner sleeve having an inner screw hole secured in the through hole, the inner sleeve being kept a distance apart from an end edge of the through hole to form an inner annular trough portion at an outer end of the through hole; a threaded cylinder being insertedly connected to the inner annular trough portion of the shaft, an outer surface of the threaded cylinder being provided with an external thread, a perforation being defined in the threaded cylinder, one axial end of the threaded cylinder being provided with a cylindrical flange, the cylindrical flange being insertedly connected to the inner annular trough portion of the shaft; a bolt being insertedly disposed in the perforation of the threaded cylinder, the bolt having a driving portion and an outer threaded portion, the outer threaded portion passing through the perforation and being inserted into the through hole to be screwed into the inner screw hole of the inner sleeve so that the bolt presses and locks the threaded cylinder and the shaft, wherein another axial end of the threaded cylinder is provided with a recess communicating with the perforation, and the driving portion of the bolt is received in the recess.

2. A quick-release device for a bicycle, comprising a shaft in the form of a hollow rod having a through hole therein, one end of the shaft being provided with a locking assembly, another end of the shaft being provided with an inner sleeve having an inner screw hole secured in the through hole, the inner sleeve being kept a distance apart from an end edge of the through hole to form an inner annular trough portion at an outer end of the through hole; a connecting holder being insertedly connected to the inner annular trough portion of the shaft, a central orifice being defined in the connecting holder, one axial end of the connecting holder being provided with an annular flange, another axial end of the connecting holder being provided with an annular trough communicating with the orifice, the annular flange of the connecting holder being insertedly connected to the inner annular trough portion of the shaft; a threaded cylinder being insertedly connected to the annular trough of the connecting holder, an outer surface of the threaded cylinder being provided with an external thread, a perforation being defined in the threaded cylinder, one axial end of the threaded cylinder being provided with a cylindrical flange, the cylindrical flange being insertedly connected to the annular trough of the connecting holder; a bolt being insertedly disposed in the perforation of the threaded cylinder, the bolt having a driving portion and an outer threaded portion, the outer threaded portion passing through the perforation and the orifice and being inserted into the through hole to be screwed into the inner screw hole of the inner sleeve so that the bolt presses and locks the threaded cylinder and the shaft.

3. The quick-release device as claimed in claim 2, wherein another axial end of the threaded cylinder is provided with a recess communicating with the perforation, and the driving portion of the bolt is received in the recess.

\* \* \* \* \*